J. A. STEINMETZ.
SUBMARINE NET.
APPLICATION FILED MAR. 26, 1917.
1,274,624.
Patented Aug. 6, 1918.
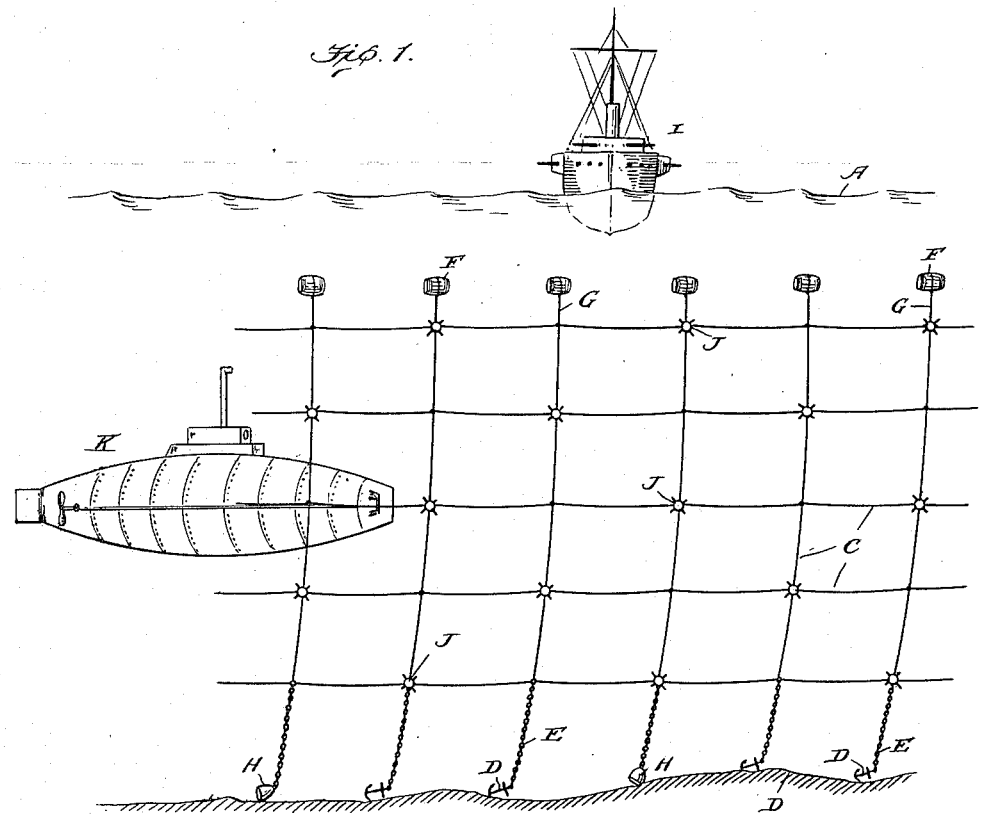
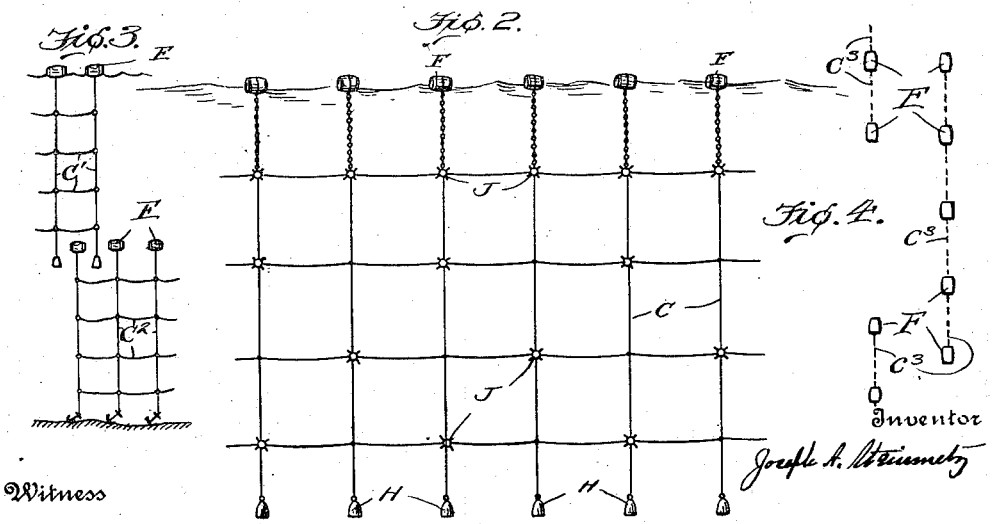
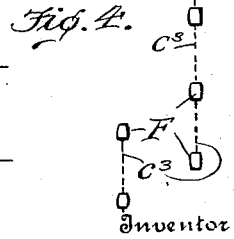

UNITED STATES PATENT OFFICE.

JOSEPH A. STEINMETZ, OF PHILADELPHIA, PENNSYLVANIA.

SUBMARINE-NET.

1,274,624.  Specification of Letters Patent.  Patented Aug. 6, 1918.

Application filed March 26, 1917. Serial No. 157,389.

*To all whom it may concern:*

Be it known that I, JOSEPH A. STEINMETZ, a citizen of the United States, and resident of Philadelphia, in the county of Philadelphia and State of Pennsylvania, have invented certain new and useful Improvements in Submarine-Nets, of which the following is a specification, reference being had therein to the accompanying drawing.

This invention relates to the destruction of submarines while they are submerged, and to that end nets bearing numerous small contact bombs are held in vertical position in the probable path of submarines.

In the diagrammatic drawings forming a part of this application,

Figure 1 shows in elevation a net provided with bombs and held by anchors below and by submerged floats above.

Fig. 2 is a similar view showing a net carried by floats and kept approximately vertical by weights pendant from its lower margin.

Fig. 3 is a view analogous to Figs. 1 and 2 showing the concurrent use of a plurality of floating and anchored nets.

Fig. 4 is a plan view illustrating the use of a plurality of distinct spaced nets for barring, in shallow or deeper water, and along lines of any length, the passage of submarines.

In these views, A represents the surface of the water, B the bottom or earth, C a net preferably of wire having any large meshes which, however, are not large enough to permit a submarine to pass through. This net is shown in Fig. 1 as having a series of anchors D of any suitable character attached by chains E to its lower margin and engaging the bottom or earth, and further having above a series of floats F connected to its upper margin by ties G. The buoyancy of the floats causes the net to be yieldingly drawn upward, at all times, with sufficient force to hold the net extended. Weights H may also be added at the lower side if desired. The arrangement is such that the net is always below the path of any surface vessel I. Attached to the net at intervals, and preferably at the intersections of the wires are numerous small contact bombs J each containing powerful explosive in quantity sufficient to rupture the wall of any submarine K making contact with it, whether moving directly or obliquely (as shown) against the net.

Fig. 2 shows the net C carried by surface floats and held down by weights H, only, this form being especially adapted for use where the depth is such that anchors are not desirable. Obviously, the form of Fig. 1, also, could be used where anchors would merely serve as weights very far above the bottom, e. g., in mid-ocean, but weights H are simpler than anchors and so preferable where either form is available at the time of placing the nets.

It is also evident that in water of moderate depth both anchored and floating nets may be used, and that a plurality of spaced nets of either kind may be used so that without making any net unduly wide and difficult to handle, passing of a submarine at any depth to which it may safely descend may be prevented.

The use of both floating and anchored nets of comparatively small size to bar the passage of submarines is illustrated in Fig. 3, where a net C' is float-supported far above the bottom and an anchored net C² is float-extended at a lower level.

Fig. 4 shows lines of relatively small spaced nets C³ of the anchored or floating type, or both, adapted to form a bar of any desired horizontal or vertical extent.

If the buoyancy of the floats of Fig. 1 be supposed less than the weight of the net and its other attachments, the net would always be submerged as shown. If the buoyancy be greater than the weight of the net and attachments, the same figure illustrates the case where the anchors have positively engaged the bottom at low tide and the whole structure has become submerged at higher tide.

What I claim is:

1. The combination with a net in extent many times the diameter of a submarine and having numerous large meshes through none of which a submarine can pass freely, of floats secured to the upper side of the net, weights secured to the lower side of the net and adapted to resist the action of said floats when engaged with the earth or bottom, but inadequate, when free from the bottom, for submerging the floats, and contact bombs secured to all regions of the net and adapted to explode when brought into contact with a submarine deflecting the net in any of said regions.

2. The combination with weighted nets and floats capable of supporting the same when free from the sea bottom, of similar nets at a lower level secured to the sea bottom by anchors and having buoyant net-extending members connected to their upper margins.

In testimony whereof I hereunto affix my signature.

JOSEPH A. STEINMETZ.